May 21, 1968
JAMES E. WEBB
ADMINISTRATOR OF THE NATIONAL
AERONAUTICS AND SPACE
ADMINISTRATION
POSITIVE LOCKING CHECK VALVE
Filed July 20, 1967
3,384,111
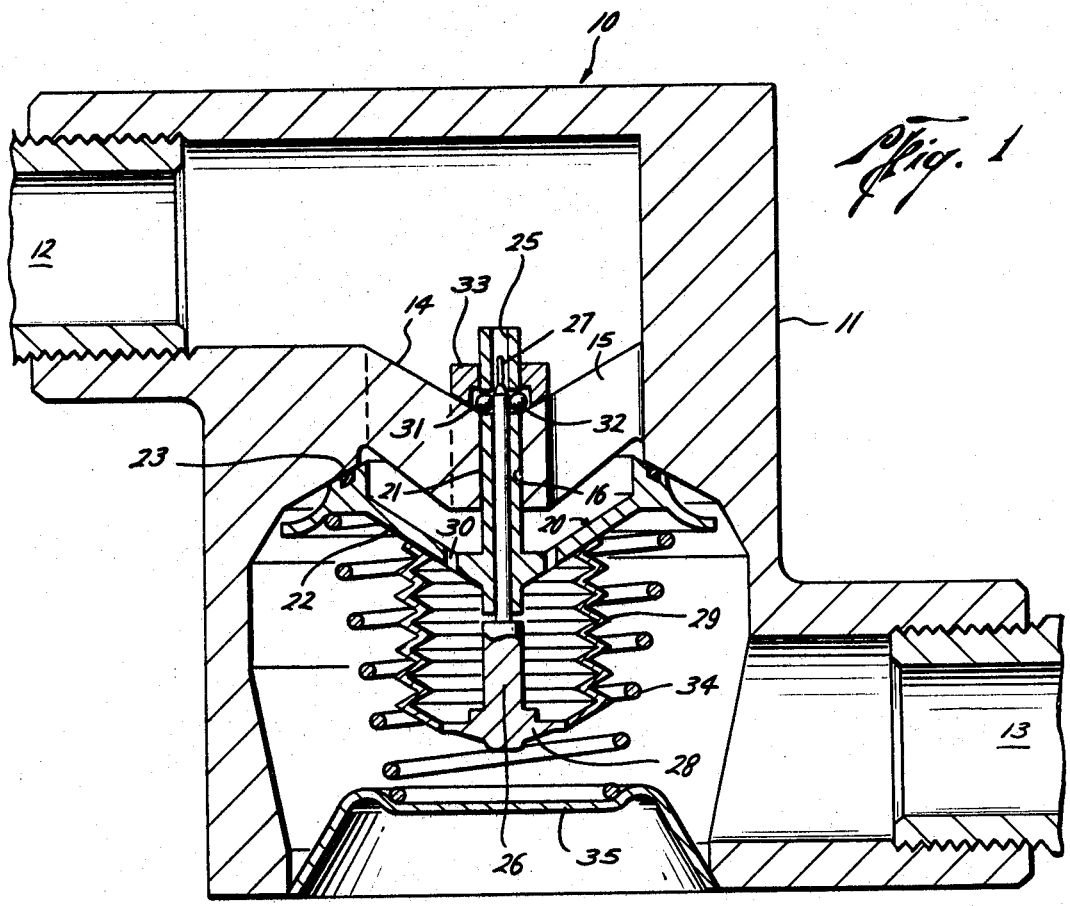
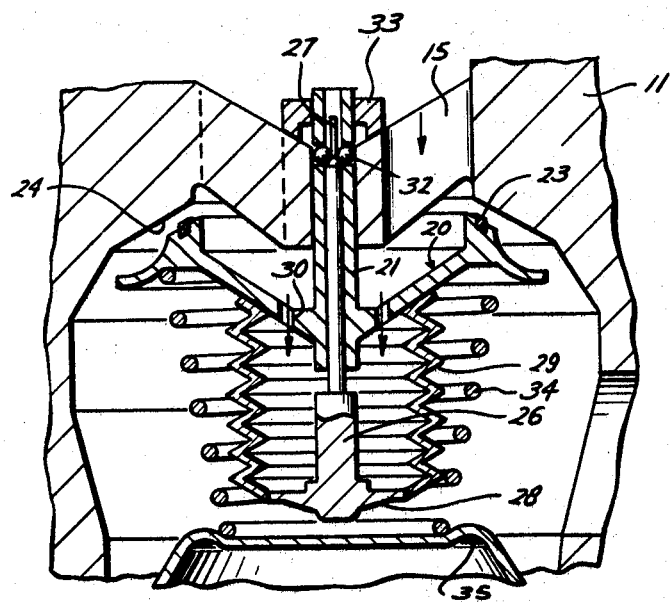
Norbert E. Cahill
INVENTOR
BY
ATTORNEY United States Patent Office 3,384,111
Patented May 21, 1968

3,384,111
POSITIVE LOCKING CHECK VALVE
James E. Webb, Administrator of the National Aeronautics and Space Administration, with respect to an invention of Norbert E. Cahill, Anaheim, Calif.
Filed July 20, 1967, Ser. No. 655,724
6 Claims. (Cl. 137—496)

ABSTRACT OF THE DISCLOSURE

A check valve assembly capable of opening to allow flow in one direction and of closing and locking to prevent flow in the opposite direction. The valve, by actually locking against reverse flow, is extremely stable and will not flutter or accidentally unseat under vibrational and/or shock loads. Structurally, the valve assembly has a ball detent latch which normally locks the valve in a closed position. The detent latch is normally held in a latched position by the compression spring force of a bellows which is attached to the latch and which is positioned to be expanded by forward flow through the assembly. Upon expansion of the bellows, the valve is unlatched and opened for flow. Reverse flow will reseat the valve, collapse the bellows, and actuate the latch to lock the assembly in a closed position.

---

The invention described herein was made in the performance of work under a NASA contract and is subject to the provision of section 305 of the National Aeronautics and Space Act of 1958, Public Law 85–568 (72 Stat. 435; 42 U.S.C. 2457).

Background of the invention

The present invention relates to a check valve assembly capable of opening to allow flow in one direction, and of closing and locking to prevent flow in the opposite direction, and one which is extremely stable under vibration, acceleration, and shock loads. It also eliminates the tendency of the valve to flutter at the critical cracking point, which is typical of most other types of valves.

The use of check valves in flow systems to allow flow only in one direction is old and well known in the art. Typical of such values is one which utilizes a ball-and-cage assembly wherein the ball is displaced from its seat by forward flow and is reseated by reverse flow. While such valves are adequate in some simple flow systems, they are inadequate in others. This is due to the fact that the valve is held on the seat solely by back pressure of the flow, and any vibrations, shock, or the like, may accidentally unseat the valve to allow back flow which may be highly detrimental to the system.

One well known procedure for alleviating the above mentioned problem is to use a spring to positively bias the valve onto its seat. This is satisfactory in many instances, but not in all since the force of the spring must be such to insure that the normal pressure of the flow will open the valve. Where the flow pressure of the system is low, the force of the spring is accordingly low and the valve is still subject to accidental unseating. Even in high pressure systems where a spring having substantial force can be used, the possibility still exists that a sudden acceleration, shock, or harmonic vibrations may temporarily unseat the valve. In these instances, the entire flow system may become unbalanced by a back surge of flow.

An example of such a system is the propellant flow system for a typical rocket motor. It is vitally important to prevent back flow of either oxidizer or fuel to the opposite component since normally such components are hypergolic and will ignite when mixed. Also, the combustive vapors and the like are highly corrosive, and it is undesirable to have any back flow of such vapors through the system. It is readily apparent that any valves utilized in a pressurization and propellant flow system of a rocket will very likely be subjected to intense vibrations, shock, and acceleration loads during flight operations of the rocket, any of which could cause temporary and possibly disastrous unseating of the valves.

Summary

The present invention provides a check valve which readily opens for normal flow, but one which quickly closes and locks whenever there is back surge of pressure. The more the back pressure increases or fluctuates, the tighter the valve will seat. By positively locking in a closed position, the valve is virtually unaffected by shock loads, or the like, and will not accidentally unseat or flutter as do most known prior art check valves.

Structurally, the preferred embodiment comprises a body having an inlet and an outlet. A valve is slidably mounted in the body which cooperates with a seat in the body to block flow through the body whenever the valve is in a closed position. A spring is positioned in the body to normally bias the valve to a closed position. Slidably mounted in the valve is a plunger which cooperates with ball detent means to normally latch the valve in said closed position. The plunger is held in a normal latched position by the compressive force of a bellows which is attached to the plunger. The bellows is positioned to be expanded by regular flow through the valve and upon expansion will move the plunger to release the ball detent means and allow the valve to open. A back surge of pressure will reseat the valve, collapse the bellows, and relatch the ball detent means.

The actual construction, operation, and the apparent advantages of the invention will be better understood by referring to the drawings in which like numerals identify like parts and in which:

Brief description of the drawings

FIG. 1 is a cross-sectional view of the valve assembly in accordance with the present invention showing said assembly in a closed and latched position; and FIG. 2 is a partial cross-sectional view of the valve assembly showing said assembly in an opened and unlatched position.

Description of the preferred embodiment

Referring more particularly to the figures, check valve assembly comprises an elbow-shaped body 11 having an inlet 12 and an outlet 13. Formed integrally within body 11 is spider cage 14 which has openings 15 (only one is shown in cross-sectional view) therethrough which communicate the inlet and outlet to establish flow through the body. Spider 14 has a central bore 16 therethrough in which stem 21 of valve 20 is slidably mounted. Valve 20 is flared at the lower end of stem 21 to form flange 22. A sealing means 23 is provided around the upper periphery of flange 22 which cooperates with valve seat 24 to effectively block flow through outlet 13 whenever valve 20 is in a closed position.

Stem 21 has an axial passage 25 therethrough in which plunger 26 is slidably mounted. Plunger 26 has a reduced portion 27 at one end and a disk-like portion 28 at the other. A flexible bellows 29 is bonded or otherwise secured at one end to flange 22 of valve 20, and at its other end to portion 28 of plunger 26. Bellows 29 has a natural compressive force which causes the bellows to collapse when in a deflated condition. Ports 30 are provided in flange 22 to establish communication between openings 15 and the interior of bellows 29 for a purpose that will be explained below.

Positioned within holes 31 which are drilled in stem 21 are ball detents 32. The diameter of detents 32 is such that when plunger 26 is in the position shown in FIG. 1, the detents will extend outward through holes 31 to contact spider 14 and to latch stem 21 with respect to spider 14. Detents 32 are held in place by retainer 33. Spring 34 is positioned between valve 20 and recessed cover 35 to normally bias valve 20 to a closed position.

The operation of valve assembly 10 is as follows: with valve assembly in the closed and locked position as shown in FIG. 1, the fluid to be controlled is admitted to assembly 10 through inlet 12. Flow will pass through openings 15 in spider 14 and will normally be blocked by valve 20. However, flow will occur through ports 30 in flange 22 and will pass into bellows 29 to expand same. Bellows 29, upon expanding, will move plunger 26 downward until reduced portion 27 of plunger 26 registers with holes 31 in stem 21. In this position, the cam-like surface of spider 14 will allow balls 32 to move down into contact with reduced portion 27 of plunger 26 and out of contact with spider 14, thereby releasing stem 21 for movement. Pressure of the flow will now act on flange 22 to move valve 20 against the bias of spring 34 to unseat sealing means 23 and allow flow through outlet 13.

With bellows 29 in an expanded position, valve 20 is free to function as a normal check valve with the valve being controlled by spring 34, as is well known in the art. However, upon an increase in downstream pressure such as may be encountered by a back surge of flow, or the like, spring 34 will immediately close valve 20 and the increased pressure will collapse bellows 29. This moves plunger 26 upward to re-engage balls 30 with spider 14 to thereby positively lock valve 20 in a closed position.

As long as the downstream pressure is equal to or greater than the upstream pressure, valve 20 will remain in a locked condition, thereby eliminating a possible accidental unseating or fluttering of the valve due to vibrations, shock, or acceleration loads. Although a particular embodiment of the subject invention has been illustrated and described, the disclosure is intended to cover all changes and modifications therein which do not constitute departure from the spirit and scope of the invention.

What is claimed and desired to be secured by Letters Patent is:

1. A check valve assembly highly stable under vibrational or shock loads comprising:
   a body having an inlet and an outlet, said body having valve seat means between said inlet and said outlet;
   resiliently biased valve means movably mounted in said body and cooperable with said valve seat means to open said valve assembly against the resistance of said bias for forward fluid flow and to close said assembly under the influence of said bias when said fluid flow stops or reverses;
   latch means on said valve means to positively lock said valve means on said seat means to prevent reverse flow through said valve assembly; and
   release means on said valve means to release said latch means to unlock said valve means to allow forward flow through said valve assembly.

2. A check valve assembly as set forth in claim 1 wherein said valve means comprises:
   a valve having a stem which is slidably mounted in said body, said valve being movable from an open position when said valve is away from said seat means to a closed position when said valve is in contact with said seat means.

3. A check valve assembly as set forth in claim 2, wherein said stem of said valve has an axial bore therethrough and wherein said latch means comprises:
   a plunger slidably mounted in said valve, said plunger having a reduced portion at one end thereof;
   a plurality of detents movably mounted in respective openings through said stem into said bore, said openings being positioned on said stem so that said plunger will normally engage said detents to hold said detents in contact with said body to thereby lock said valve when said valve is in a closed position, and so that said detents will disengage said body to release said valve whenever said reduced portion of the plunger is moved adjacent said detents.

4. A check valve assembly as set forth in claim 3, wherein said release means comprises:
   expandable means connected to said valve and said plunger so that expansion of said expandable means will move said plunger relative to said valve to release said detents; and
   passage means in said valve for fluidly communicating said inlet with said expandable means so that forward flow through said valve assembly will normally expand said expandable means.

5. A check valve assembly as set forth in claim 4, wherein said expandable means comprises:
   a flexible bellows normally in a deflated position.

6. A check valve assembly highly stable under vibrational or shock loads comprising:
   a body having an inlet and an outlet and a spider element having passages therethrough to establish flow through said body and a central bore therethrough;
   valve means having a stem slidably mounted in said central bore of said spider, said stem having an axial passage therethrough and a plurality of openings through the wall thereof;
   seal means on said valve means which engage said spider to block flow when said valve is in a closed position;
   means in said body normally biasing said valve means to a closed position;
   a plunger slidably mounted in said axial passage of said stem and having one end extending from said passage; said plunger having a reduced portion at its other end;
   ball detents, one loosely positioned in each of said openings in said stems, said opening being positioned on said stem so that said plunger will normally engage said detents to hold said detents in contact with said spider element to thereby lock said valve when said valve means is in a closed position and so that said detents will disengage said spider to release said valve means whenever said reduced portion of said plunger is moved adjacent said detents; and
   a bellows connected at one of its ends to said valve means and at its other end to said plunger, said valve means having passages therein to communicate flow through said inlet to the interior of said bellows so that normal flow will expand said bellows to release said ball detents.

References Cited

UNITED STATES PATENTS

| | | | |
|---|---|---|---|
| 1,461,010 | 7/1923 | Amdursky | 137—467 |
| 2,525,487 | 10/1950 | Johnson | 137—467 |
| 3,263,698 | 8/1966 | Siggelin | 137—467 |

WILLIAM F. O'DEA, *Primary Examiner.*

H. W. WEAKLEY, *Assistant Examiner.*